Patented Feb. 5, 1952

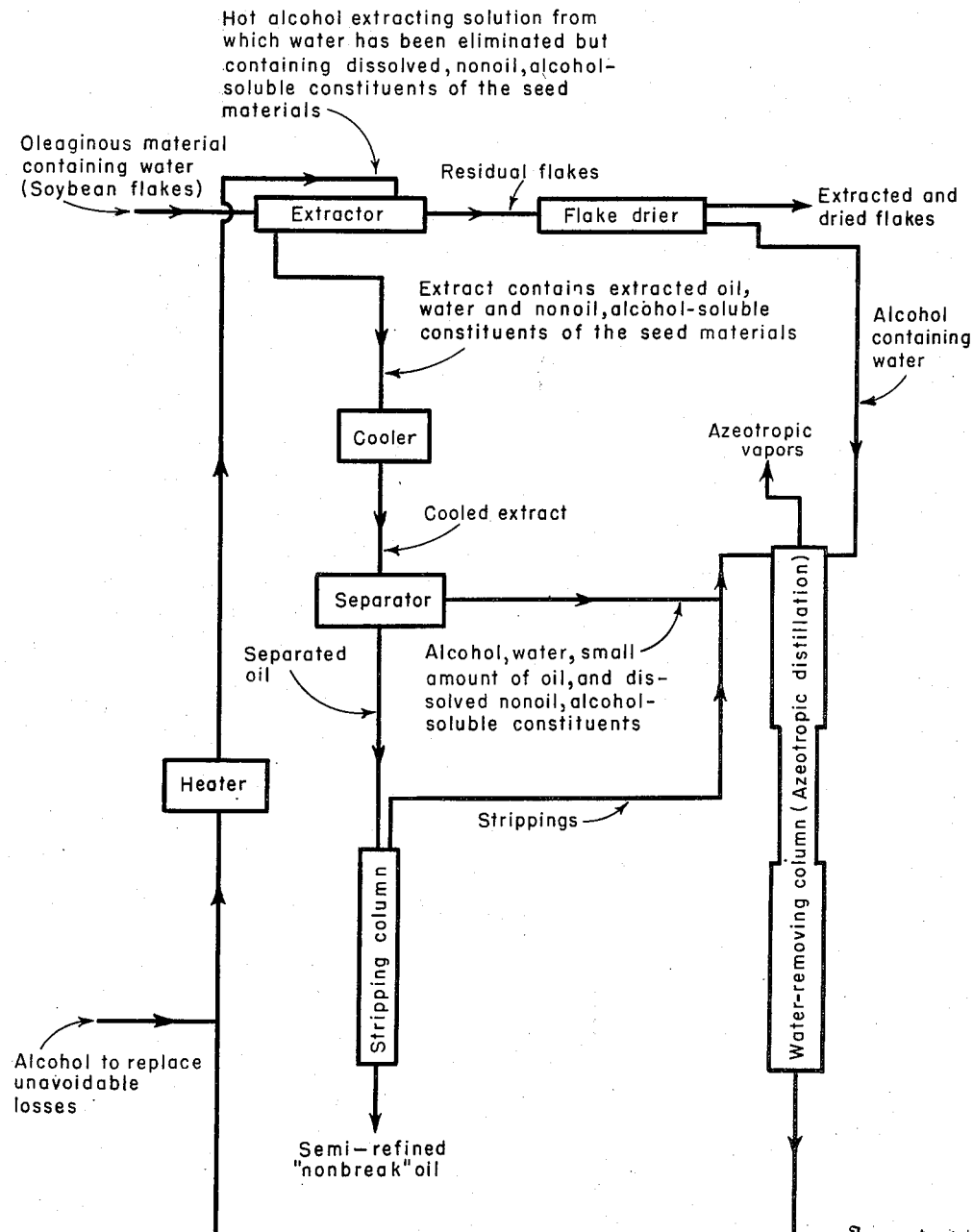

2,584,108

UNITED STATES PATENT OFFICE 2,584,108

PROCESS FOR THE CONTINUOUS RECYCLING OF AN ALCOHOLIC OIL SOLVENT IN OIL EXTRACTION

Arthur C. Beckel and John C. Cowan, Peoria, Ill., assignors to the United States of America as represented by the Secretary of Agriculture Application November 9, 1948, Serial No. 59,122

4 Claims. (Cl. 260—412.4)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation in part of our copending application for patent, Ser. No. 593,910, filed May 15, 1945 now abandoned.

This invention relates to a process of separating oil from oleaginous seed materials, and has among its objects a process for the continuous recycling of an alcohol solvent for extracting such materials in an economical and efficient manner, and by which a high quality of oil and residual meal is recovered.

Although ethyl alcohol is preferable in many respects to other solvents, it has not been possible heretofore for it to compete economically with hexane and similar liquids as a solvent for extraction of oils from oleaginous seed materials in the processes of the prior art because of the higher distillation cost of the alcohol. About 204 gram calories per gram of alcohol are required, whereas only about 80 gram calories are required per gram of hexane. Furthermore, compared to hexane, a greater quantity of alcohol is required to extract an equal amount of oil.

It has been possible to circumvent partially the energy requirement disadvantage by recirculating the alcohol. According to such known processes, the oil is extracted from the oleaginous seed material at or near the boiling point of alcohol and the extract cooled. That oil which settles is separated, and the supernatant alcohol solution is recirculated until the oil solvent characteristics are materially decreased. At the last cycle the solution is drawn off into a still to recover the oil remaining in solution as well as the byproduct materials, including such nonoil, alcohol soluble constituents as lecithin, sugars, and sterols.

One of the principal obstacles to the complete success of such a recirculation system is the absorption of water contained in the oleaginous seed material along with the extracted oil by the alcohol with a resultant rapid decrease in the oil solvent properties of the alcohol. This limits the number of times the extracting solution can be recycled.

Although the number of cycles for the alcohol solvent may be increased by reducing the water content of the material from which the oil is to be extracted, such reduction in moisture content is objectionable in that it results in the loss of color of the extracted flakes and resultant proteins, thus lessening their economic value.

The present invention obviates these difficulties and allows alcohol to compete directly with hexane and other oil solvents.

In general, according to the present invention, a hot alcohol extracting solution from which the water has been substantially eliminated but containing dissolved, nonoil, alcohol-soluble constituents of the oleaginous seed material being extracted, is continuously recirculated to extract the oil from the material, the residual meal or flake being continuously recovered.

The concentration of the nonoil, alcohol-soluble constituents of this extracting solution automatically becomes such that a state of equilibrium is reached and substantially no further quantity of these constituents is removed from the material with the extract. Consequently, in effect, only oil and water are extracted from the material and the residual meal or flakes will contain substantially all of the nonoil, alcohol-soluble constituents, thus producing a final recovered meal or flakes corresponding closely to the oil-free and moisture-free composition of the original material.

The resulting extract, which contains the extracted oil, water and nonoil, alcohol-soluble constituents of the seed material, is cooled to cause separation of the oil therefrom, and the oil is continuously separated and recovered, leaving a solution containing the alcohol, water removed from the material, and the dissolved nonoil, alcohol-soluble constituents.

The oil thus recovered is of high quality, being a semi-refined "nonbreak" oil, with little of the nonoil, alcohol-soluble constituents, and it may be used as such for many purposes without further processing.

The solution remaining after separation of the oil is continuously treated to eliminate only water therefrom, leaving an alcohol-extracting solution corresponding in composition to that first mentioned, which solution is continuously recycled for extracting the oil from the material. In this treatment it is preferred to eliminate substantially all of the water, since the oil solvent characteristics of the alcohol are decreased with the higher water content. It is not essential, however, that all the water be eliminated, so long as the alcohol is sufficiently concentrated to have good oil solvent characteristics.

The process of this invention is specifically illustrated in the accompanying flow diagram of a preferred arrangement.

The oleaginous seed material, particularly soybean flakes, containing moisture, is continuously fed into an extractor, and the residual flakes, remaining after the oil and water are extracted, pass to a flake drier to dry entrained alcohol and water therefrom. The extracted and dried flakes are continuously discharged from the drier and are recovered.

The particular form of the oleaginous seed material to be extracted may be varied. It may be derived from soybeans or other oil-bearing seeds. It is desirable that the natural structure of the beans be broken up to some extent in order to promote access to the contained oil by the alcohol. For example, instead of flakes, the material may be cracked, ground, crushed, or otherwise treated prior to extraction. The moisture content may vary over a wide range. For example, the soybean flakes employed may vary in moisture content from 5 to 12 percent depending upon previous conditions. Seed materials with their natural moisture content of about 10 to 12 percent are, however, preferred for economic reasons.

The hot alcohol extracting solution enters the extractor as illustrated. This solution has a temperature sufficiently high to dissolve substantial quantities of the oil from the material into the solution, preferably a temperature near its boiling point, that is, about 75° to 80° C.

In continuous operation, after equilibria have been established for the recycling conditions, this extracting solution contains minor proportions of dissolved, nonoil, alcohol-soluble constituents of the soybean flakes in an amount of about 3 to 6 percent. This solution, we have discovered, removes the oil from the flakes surprisingly well and efficiently. The presence of the minor proportions of the constituents mentioned does not reduce the oil solvent properties of the alcohol significantly.

The extract passing to a cooler carries in solution the extracted oil, water removed from the flakes, and the dissolved, nonoil, alcohol-soluble constituents of the material. In the cooler, the temperature of the extract is reduced, preferably to about 10° to 15° C., to cause separation of the oil from the extract. The cooled extract passes to a separator where most of the oil is continuously separated. This separated oil passes to a stripping column where it is discharged and is continuously recovered. This oil is the semi-refined "nonbreak" oil previously mentioned.

The solution remaining after separation of the oil contains alcohol, water, a small amount of oil, and the dissolved nonoil, alcohol-soluble constituents. It passes to a water-removing column, and also the strippings, comprising small amounts of alcohol containing water, pass from the stripping column to the water-removing column.

In the water-removing column, the water is continuously eliminated, as for example, by azeotropic distillation with benzol, thus to eliminate substantially all of, but only, the water. The solution remaining corresponds to the extracting solution mentioned above, and it is continuously recycled through a heater and to the extractor for extracting the material, as illustrated.

The flow sheet indicates removal of the azeotropic vapors which may be processed for recovery of the benzol in a conventional manner.

Small amounts of alcohol containing water are continuously removed from the material in the drier and fed into the water-removing column.

When the process is operating in a state of equilibrium, there will be no significant change in the extracting solution entering the extractor, since the rate of water removal in the water-removing column will equal the rate at which it is added from the oleaginous seed material, and the rate of dissolving the nonoil, alcohol-soluble constituents from the material being extracted will equal the rate at which these constituents are redeposited in the drier, the net effect being removal of only oil and water from the material. The process requires only the addition of small amounts of alcohol needed to replace unavoidable losses. This addition may be accomplished at any part of the extraction cycle, preferably directly into the extracting solution as illustrated.

The process is not limited to the use of any particular apparatus. Any one of several extractors may be used so long as it is adapted to the use of ethyl alcoholic solutions at or near the boiling point. A heat exchanger may be used in conjunction with the cooler to conserve the heat energy dissipated there. The separator may be a centrifuge and may incorporate a small filter to remove fines. Any one of a wide variety of stripping columns may be used, since ethyl alcohol is easily stripped from oil. The water-removing column may be of the type to utilize benzol for the azeotropic distillation of water or it may use ether or any other suitable material for such azeotropic distillation. It may be an apparatus packed with a desiccating material capable of being replaced or regenerated. Practically any flake drier may be used, since the entrained alcohol and water can be easily dried from the residual flakes.

From the above, it may be seen that the oil is recovered from the extract by cooling at a loss of only a small amount of sensible heat, and the oil solvent powers of the extracting solution are restored by the expenditure of only the energy necessary to remove the water, such as by azeotropic distillation, and without the necessity of vaporizing much of the solvent. This is in sharp contrast to methods utilizing hexane and similar solvents whereby the oil is recovered by distilling the entire quantity of solvent used with the loss of the latent heat of vaporization required for that operation.

If in the process of the present invention, the oil alone is to be recovered from the oleaginous seed material without concern as to the quality of the extracted flakes, the water content of such material may be reduced as far as practicable thereby reducing sharply the requirements for removal of water in the water-removing column.

The energy required in the stripping column to strip the residual alcohol from the oil is entirely recovered by the system either by passing the vaporized alcohol directly to the water-removing column or optionally to a rectifying column (not shown) when using the benzol azeotrope. This may be contrasted with the loss of energy required to strip residual hexane and similar solvents from soybean oil. Such losses to the system are not only in the form of sensible heat, but also latent heat of vaporization. In addition, the energy required in the flake drier to vaporize the entrained alcohol and water is returned entirely to the systems either by way of the water-removing column or optionally to a rectifier; whereas the energy required in the drier to vaporize entrained hexane is entirely lost.

Furthermore, the oil resulting from the present process is semi-refined, and because of the absence of substantially all "break" material and because of the low free fatty acid content (less than 0.10%), no further refining is needed for most purposes. On the other hand, the oil resulting from hexane extraction is a crude oil containing, among other things, phosphatides and free fatty acids which cause a considerable "break" and therefore requires a further refining process before it can be used.

The following table shows typical constants for soybean oils extracted by various solvents:

| Solvent | Lovibond color | | Free fatty acid, Per cent | Break, Per cent |
| --- | --- | --- | --- | --- |
| | Yellow | Red | | |
| Trichlor ethylene | 70 | 10.3 | 1.04 | 1.00 |
| Dichlor ethylene | 70 | 14.4 | 0.52 | (*) |
| Carbon tetrachloride | 70 | 12.8 | 0.95 | 0.86 |
| Ethyl alcohol | 70 | 2.9 | 0.06 | 0.00 |

*Not determined.

Having thus described the invention, what is claimed is:

1. A continuous process of separating oil from oleaginous seed material containing water, comprising continuously feeding the material into an extractor and continuously extracting it with an extracting solution comprising alcohol sufficiently concentrated to have good oil solvent characteristics, and dissolved, nonoil, alcohol-soluble constituents of the material, at a temperature sufficiently high to dissolve substantial quantities of the oil from the material into the extracting solution, whereby the resulting extract will contain in solution the extracted oil, water removed from the material, and nonoil, alcohol-soluble constituents of the material; continuously cooling the extract to cause separation of the oil therefrom; continuously separating a substantial quantity of the oil from the cooled extract leaving a remaining solution containing the alcohol, water, and the nonoil, alcohol-soluble constituents; continuously recovering the separated oil; continuously eliminating water from the remaining solution leaving an extracting solution corresponding to the extracting solution first mentioned; and continuously recycling this extracting solution to the extractor for extracting the material.

2. A continuous process of separating oil from oleaginous seed material containing water, comprising continuously feeding the material into an extractor and continuously extracting it with an extracting solution consisting of alcohol from which the water has been substantially eliminated, and dissolved, nonoil, alcohol-soluble constituents of the material, at a temperature sufficiently high to dissolve substantial quantities of the oil from the material into the extracting solution, whereby the resulting extract will contain in solution the extracted oil, water removed from the material, and nonoil, alcohol-soluble constituents of the material; continuously cooling the extract to cause separation of the oil therefrom; continuously separating a substantial quantity of the oil from the cooled extract leaving a remaining solution containing the alcohol, water, and the nonoil, alcohol-soluble constituents; continuously recovering the separated oil; continuously eliminating water from the remaining solution leaving an extracting solution corresponding to the extracting solution first mentioned; continuously recycling this extracting solution to the extractor for extracting the material; and continuously recovering the extracted, residual material from the extractor.

3. A continuous process of separating oil from soybean seed material containing water, comprising continuously feeding the material into an extractor and continuously extracting it with an extracting solution consisting of alcohol from which the water has been substantially eliminated, and dissolved, nonoil, alcohol-soluble constituents of the material, at a temperature sufficiently high to dissolve substantial quantities of the oil from the material into the extracting solution, whereby the resulting extract will contain in solution the extracted oil, water removed from the material, and nonoil, alcohol-soluble constituents of the material; continuously cooling the extract to cause separation of the oil therefrom; continuously separating a substantial quantity of the oil from the cooled extract leaving a remaining solution containing the alcohol, water and the nonoil, alcohol-soluble constituents; continuously recovering the separated oil; continuously eliminating water from the remaining solution leaving an extracting solution corresponding to the extracting solution first mentioned; continuously recycling this extracting solution to the extractor for extracting the material; and continuously recovering the extracted, residual material from the extractor.

4. A continuous process of separating oil from oleaginous seed material containing water, comprising continuously feeding the material into an extractor and continuously extracting it with an extracting solution consisting of alcohol from which the water has been substantially eliminated, and dissolved, nonoil, alcohol-soluble constituents of the material, at a temperature sufficiently high to dissolve substantial quantities of the oil from the material into the extracting solution, whereby the resulting extract will contain in solution the extracted oil, water removed from the material, and nonoil, alcohol-soluble constituents of the material; continuously cooling the extract to cause separation of the oil therefrom; continuously separating a substantial quantity of the oil from the cooled extract leaving a remaining solution containing the alcohol, water, and the nonoil, alcohol-solube constituents; continuously recovering the separated oil; continuously drying entrained alcohol and water from the extracted, residual material from the extractor; continuously recovering the extracted and dried material; continuously eliminating water from the remaining solution and from the alcohol and water dried from the extracted, residual material, leaving an extracting solution corresponding to the extracting solution first mentioned; and continuously recycling this extracting solution to the extractor for extracting the material.

ARTHUR C. BECKEL.
JOHN C. COWAN.

REFERENCES CITED

The following references are of record in the file of this patent:

UNITED STATES PATENTS

| Number | Name | Date |
|---|---|---|
| 1,892,366 | Sato | Dec. 27, 1932 |
| 2,377,135 | Dinley et al. | May 29, 1945 |
| 2,377,975 | Singer | June 12, 1945 |
| 2,467,403 | Pascal | Apr. 19, 1949 |
| 2,467,404 | Pascal | Apr. 19, 1949 |
| 2,469,147 | Beckel et al. | May 3, 1949 |

OTHER REFERENCES

Horvath, A. A.: "The Soybean Industry," 1938, page 72.

Markley, K. S. and W. H. Goss: "Soybean Chemistry and Technology," 1944, pages 193 and 194.

Sato et al.: Abstracts from Report of the Central Laboratory, South Manchurian Railway Co., Dairen (1929), pages 1 to 7.